United States Patent [19]

Shaw et al.

[11] Patent Number: 4,770,068

[45] Date of Patent: Sep. 13, 1988

[54] APPARATUS FOR ASSEMBLING ROCK BITS

[75] Inventors: Robert H. Shaw, Houston; James E. White, Kemah, both of Tex.

[73] Assignee: Diesel Recon Company, Columbus, Ind.

[21] Appl. No.: 925,693

[22] Filed: Oct. 29, 1986

[51] Int. Cl.$^4$ ............................................. B21K 29/00
[52] U.S. Cl. .................................. 76/108 A; 228/222
[58] Field of Search ............. 76/108 R, 108 A, 101 R, 76/101, 5 R; 219/121 EC, 121 ED, 121 EX, 121 EZ, 121 EB, 121 EM; 228/222; 277/173, 174, 177, 82, 83, 198

[56] References Cited

U.S. PATENT DOCUMENTS

| | | |
|---|---|---|
| 2,768,595 | 10/1956 | Kalbow et al. ..................... 228/222 |
| 2,768,596 | 10/1956 | Kalbow et al. ..................... 228/222 |
| 3,850,256 | 11/1974 | McQueen . |
| 4,055,225 | 10/1977 | Millsapps . |
| 4,158,973 | 6/1979 | Schumacher, Jr. et al. . |
| 4,187,743 | 2/1980 | Thomas . |
| 4,212,474 | 7/1980 | Arai ...................................... 277/84 |
| 4,256,194 | 3/1981 | Vare . |
| 4,274,498 | 6/1981 | Penny . |
| 4,276,946 | 7/1981 | Millsapps, Jr. . |

FOREIGN PATENT DOCUMENTS 106680  6/1985  Japan ............................ 219/121 EC

OTHER PUBLICATIONS

Excerpt from Catalog, believed to be of S-P Manufacturing Corp., Cleveland, Oh.

*Primary Examiner*—Roscoe V. Parker
*Attorney, Agent, or Firm*—Browning, Bushman, Zamecki & Anderson

[57] ABSTRACT

An apparatus for supporting a rock bit during a welding operation for assembly or replacement of components thereon includes a swivel supporting a receptacle for the bit. The receptacle and swivel include a closed fluid system which attaches to the bit thereby allowing coolant fluid to flow through the bit during a welding operation and without regard to the angular positioning of the bit relative to the welding apparatus.

30 Claims, 5 Drawing Sheets

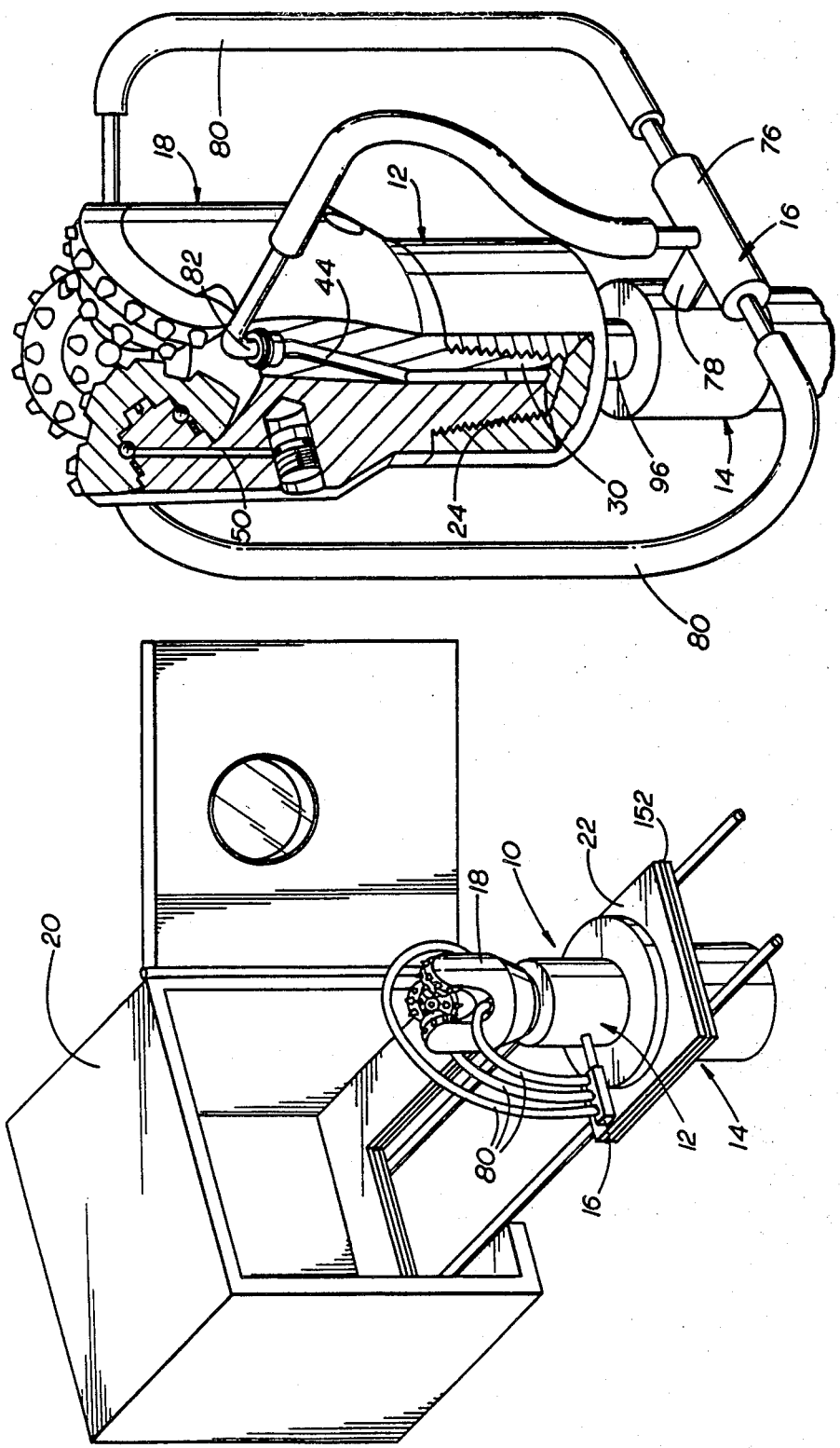

APPARATUS FOR ASSEMBLING ROCK BITS

BACKGROUND OF THE INVENTION

1. Field of the Invention

The present invention relates to an apparatus used in the assembly of roller cone rock bits, and in particular to an apparatus providing thermal control of the bit during welding operations so as to prevent damage to the components of the bit.

2. The Prior Art

Roller cone rock bits have been widely used in the petroleum industry for many years. The bits themselves have been subjected to many changes and modifications which have improved the life of the bit. However, the bits have largely remained in the category of a disposable item. That is to say that once the bit or any portion thereof is damaged or worn to the point that the bit can no longer function effectively, the entire bit is typically discarded or scrapped to be replaced with a new bit. Clearly, this is an expensive procedure.

Typically, any wear or damage to the bit occurs near or in the roller cone assemblies. This is not unexpected as the working surfaces of the cones themselves engage the rock face, and the bearings receive great loads. The upper portion of the bit is primarily a large metal member having an outer profile for mating with a tool joint and includes interior bores for the delivery of fluids to lubricate the bearings and flush out the debris cut from the formation by the bit. The upper portion of the bit, by its shear size, represents a considerable portion of the overall cost of a bit. Thus, if the upper portion can be salvaged and reused, there should be considerable savings over the cost of a new bit.

In typical new bit manufacture, three bit body pieces, each extending the full length of the bit body to be formed, and each including one leg and a sector of the tool joint, are welded together along juncture areas extending generally lengthwise of the bit body, so that the central circulation bore is actually formed during the welding process.

U.S. Pat. Nos. 3,850,250 and 4,158,973 suggest methods whereby legs with cones mounted thereon are welded to a full annular upper body portion to form a complete bit. The juncture surfaces thus welded are substantially normal to the central rotational axis of the bit. The patents suggest the use of high energy beam welding techniques, such as electron beam welding, since these techniques are very fast. However, there is a problem of heating in any welding technique. Welding massive metal bodies, such as drill bits, can cause sufficient heating of the metal at the juncture surfaces to transmit enough heat through the bit to damage the bearings and/or the seals surrounding them. This is a particular problem in the methods suggested by U.S. Pat. Nos. 3,850,250 and 4,158,973 because the transverse juncture areas are close to, and sometimes even aligned with, the seals.

One possible solution would be to use heat resistant seals. However, seals can be made heat resistant only at the expense of other properties which are highly desirable in bit seals. When using high energy beam welding techniques, particularly electron beam welding, as suggested by these prior patents, the bit body should be rotated during welding, and the welding is typically performed in a vacuum chamber. These factors would tend to complicate efforts to cool the bit during welding.

SUMMARY OF THE INVENTION

The present invention provides an apparatus and method cooling a rock bit as it is being welded. While certain aspects of the invention could be used in connection with new bit manufacture, the invention is particularly useful in connection with bit reconstruction operations, wherein the upper body portion of a used bit is salvaged, and new legs with roller cones mounted thereon are welded to the upper body portion along transverse juncture areas. Likewise, while the present invention is useful in connection with high energy beam welding techniques, it is also useful in connection with other welding techniques, all of which generate heat. Indeed, to the extent that heating problems may be even greater with more conventional welding techniques, the present invention may be particularly helpful in that regard.

The apparatus according to the present invention is intended for use in a welding chamber, for example a vacuum chamber used in connection with most high energy beam welding techniques. The apparatus therefore is mounted on a drawer or slide member which can be inserted into and withdrawn from the chamber and includes a turret fixture which receives the upper end of a rock bit. The turret fixture also includes means which cooperate with the mud circulation passages in the body portion of the bit to form a fluid circulation system, for circulating cooling fluid through the bit to maintain its temperature during a welding operation. The turret is mounted on a swivel assembly which allows the turret and bit to be rotated during the welding operation without interrupting the flow of coolant.

Using such apparatus to circulate a cooling fluid through the bit body itself during welding cools the bit and protects the vulnerable parts in two complementary ways: First, the bit body itself, which is cooled by the circulating fluid, actually serves as a heat sink; secondly, the circulating fluid itself is used to carry heat away from the bit.

Another salient feature of the invention is that it allows this cooling to be accomplished by circulating high volumes of cooling fluid at relatively low pressures. Elimination of any need for high pressure flow makes the entire operation, and corresponding apparatus, simpler, less expensive, and safer to operate in conjunction with high energy beam welding techniques.

The unique use of the bit body itself, and the mud circulation system incorporated therein, in the cooling process is a much more practical and effective cooling technique than others which might be considered, e.g. cooling of the welding fixtures or use of a water jacket surrounding the bit body.

While it is a principal object of the invention to provide an apparatus for use in assembling roller cone type rock bits, it is also an object to teach a method for controlling the temperature of the bit during any type of welding operation, so as to protest vulnerable portions of the bit from the effects of heating.

BRIEF DESCRIPTION OF THE DRAWINGS

The present invention will now be described by way of example with reference to the accompanying drawings in which:

FIG. 1 is a diagrammatic perspective of the subject invention with a rock bit mounted therein ready for insertion into a welding chamber;

FIG. 2 is a perspective view, partly in section, showing a rock bit mounted in the turret fixture of the present invention;

DETAILED DESCRIPTION OF THE PREFERRED EMBODIMENT

Figure 3:
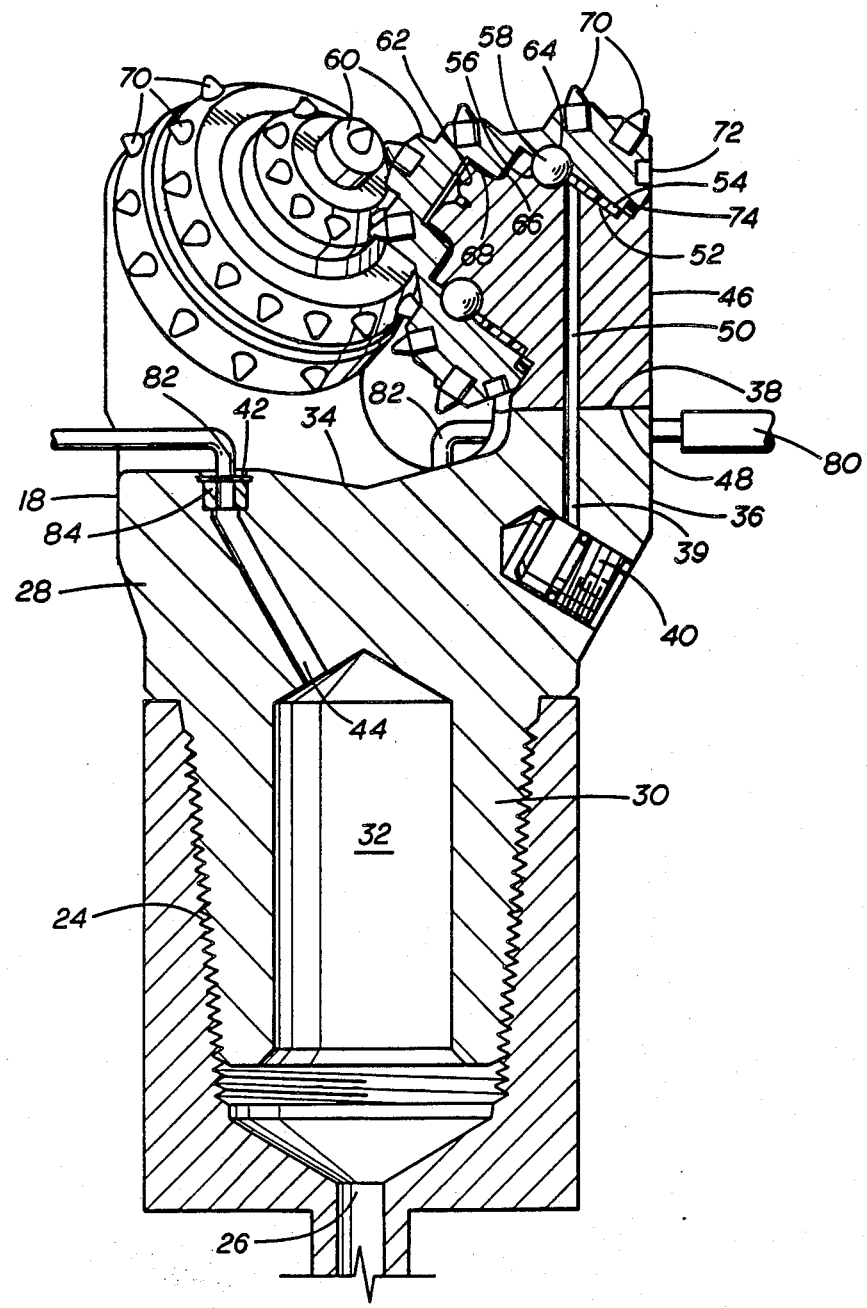
FIG. 3 is a vertical section through the turret fixture and rock bit of FIG. 2.
Figure 5:
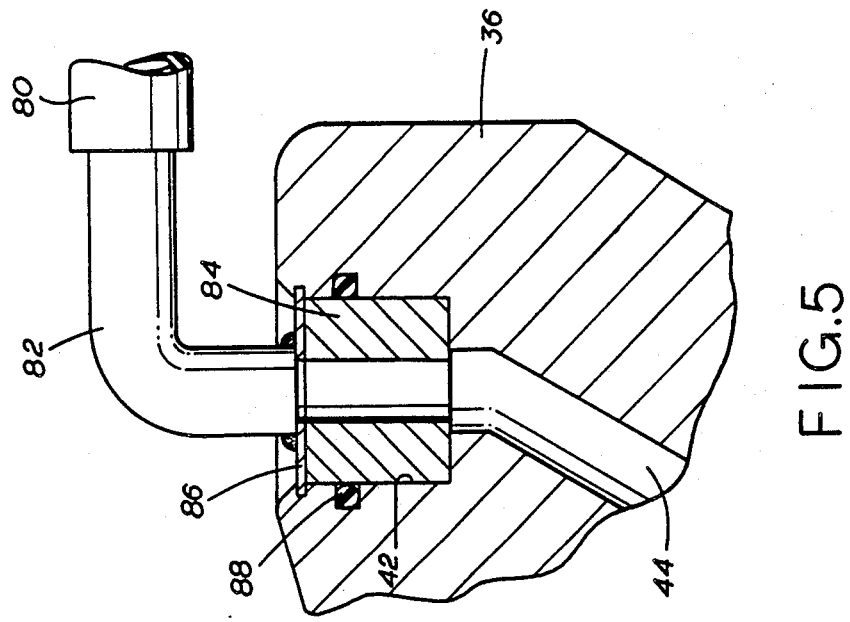
FIG. 5 is a detailed section of one fluid coupling in a jet nozzle port of the rock bit.

Referring to FIG. 1, the present invention is an apparatus 10 having a turret fixture 12, a rotary swivel assembly 14 and a fluid distribution system 16 used to support a drill bit 18 in a welding chamber 20 and provide a heat sink during welding operations. The subject apparatus 10 is mounted preferably on a slide assembly 22 for insertion into and withdrawal through a door of welding chamber 20. The welding chamber 20 could be a vacuum chamber, such as those used in connection with high energy beam welding techniques including electron beam welding and laser welding, and there would be appropriate seals (see FIG. 6) between the slide assembly 22 and abutting portions of chamber 20 and its door. Not shown in this figure are the high energy beam welding means, vacuum maintaining means, and the means to rotate the turret fixture 12 and swivel, all of which are known in the art.

Turning now to FIGS. 2 and 3, it will be seen that the turret fixture 12 is a large cylindrical member having a tapered internally threaded surface 24 terminating in a lower port 26. The turret 12 is supported on the rotary swivel assembly 14 for rotation therewith about a generally vertical axis.

The drill bit 18 illustrated is of a fairly conventional configuration and includes an upper body 28 forming an externally threaded tool joint portion 30 which is shown threadedly received in the internally threaded portion 24 of the turret fixture 12. For welding, the bit is inverted from its normal operating position. Thus, the portion of the tool body extending from crown 34 through the outer end of tool joint portion 30 is actually the upper body portion of the bit in use, and will be referred to as such herein. The upper body 28, which may be salvaged from a used bit, defines a central cavity 32. The crown 34 of the upper body 28 is surrounded by a plurality of leg support portions 36, usually three in number, integral with the upper body 28. Each leg support portion 36 has a transverse end surface 38 and a lubrication supply channel 39 extends from a lubricant supply mechanism 40 in the body 28 through the leg support portion 36. Generally opposite each leg support portion 36 is a jet nozzle bore 42 leading to an angled bore 44 connecting to the central cavity 32. A nozzle (not shown) is normally mounted in the bore 42 to direct a flow of drilling mud toward the opposing cone of the drill bit both to lubricate it and to drive debris therefrom.

A respective leg extension 46 is to be welded to each of the leg support portions 36. Each leg extension 46 has a transverse outer surface 48 with a lubricant supply channel 50 therein aligned with the like channel 39 in the upper body portion. The channel 50 leads to a profiled bearing surface 52 received in a bearing 54 and defining an outwardly directed annular race 56 which receives therein a plurality of balls 58 through a passageway (not shown). A cone body 60 having a profiled inner recess 62, including an inwardly directed annular race 64, is mounted over the bearing 54 with the balls 58 being received between races 56 and 64 to hold the cone body 60 in place. Friction-reducing coatings 66, 68 can be applied to the ends of the leg if necessary. The exterior of the cone body 60 is profiled and receives therein a plurality of tungsten carbide inserts 70 in a cutting area and wear inserts 72 in a gauge area.

The cone body 60 is sealed with respect to the leg extension 46 of the bit body by an annular elastomeric seal 74. It can be seen that a portion of the seal 74 lies quite close to the abutting surfaces 38 and 48, so that it might be vulnerable to heat damage during welding of those surfaces to join the support portion 36 and leg extension 46.

Turning now to the rotary swivel assembly 14 and fluid distribution system 16, reference is made to FIGS. 1–5. The fluid distribution system 16 includes a manifold 76 connected to an outlet 78 of the swivel assembly 14 with a plurality of flexible conduits 80 extending from the manifold 76. At the free end of each conduit 80, there is coupling 82 (FIG. 5) formed by a jet nozzle port adapter 84 having a spring retention ring 86 which fits into the jet nozzle bore 42. The adapter 84 sealingly engages annular O-ring seal 88 in the bore 42.

Figure 4:
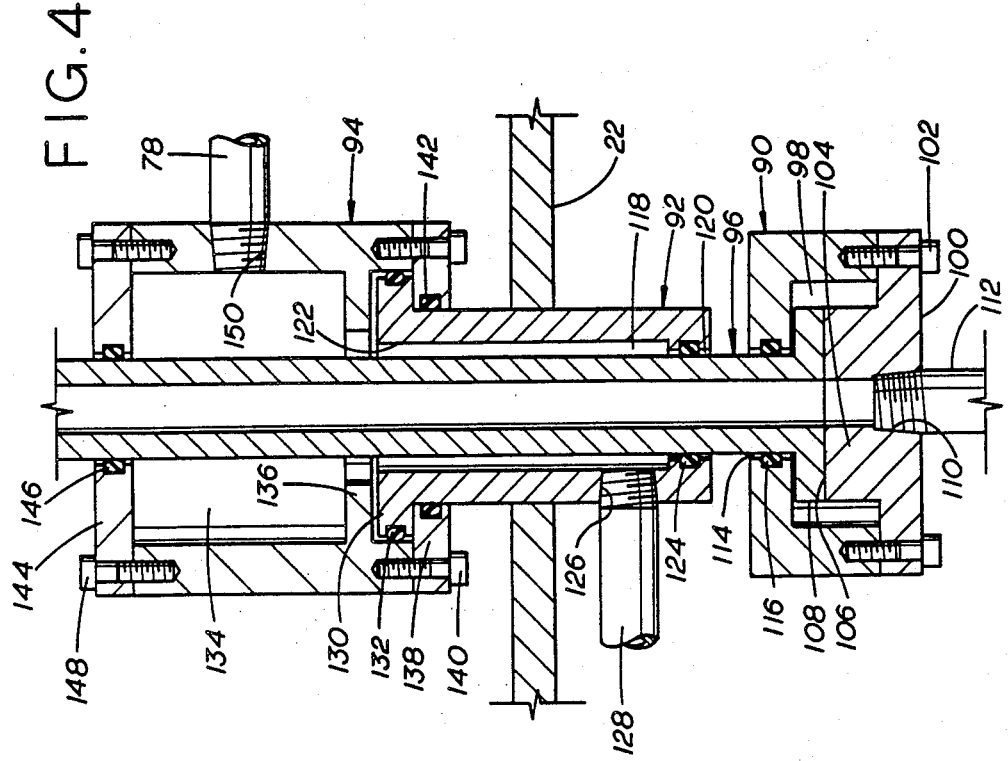
FIG. 4 is a diagrammatic vertical section through a first embodiment of a swivel according to the present invention.

The rotary swivel assembly 14 is illustrated in detail in FIG. 4. It includes a lower stationary member 90, a mid-stationary member 92, an upper rotary member 94, and a tubular rotating shaft 96 extending from the lower member 90 through the mid member 92 and out the top of the upper member 94. The turret fixture 12 (see FIGS. 1 and 2) is disposed on the upper end of shaft 96. The stationary member 90 defines a chamber 98 closed at its open lower end by a profiled cover 100 secured thereto by bolts 102. The profiled cover 100 defines an axial tubular stud 104, the upper end 106 of which forms a bearing surface to support the outwardly extending flange 108 on the lower end of shaft 96. Tubular stud 104 also forms an exit port 110 which receives a conduit 112 leading to exhaust (not shown). A second port 114 is formed in the upper end of stationary member 90 through which the rotating shaft 96 passes with an O-ring seal 116 therebetween. The intermediate stationary body 92 is fixed to slide assembly 22 by any known means, such as welding. The member 92 defines an annular chamber 118 with lower and upper openings 120, 122, respectively, through which shaft 96 passes. An O-ring seal 124 in lower opening 120 engages shaft 96. An inlet port 126 connects a fluid source (not shown) to chamber 118 by conduit 128. The upper end of member 92 has an outwardly directed flange 130 with an O-ring 132 received in its outer annular surface. The upper rotary 94 defines an annular chamber 134 with an inwardly directed annular flange 136 separating the chamber into upper and lower portions. An annular plate 138 is fastened to the lower end of the member 94 by bolts 140 with an O-ring 142 on the inner annular surface engaging the outer surface of the member 92. O-ring 132 engages the inner surface of member 94. Thus, O-rings 132, 142 provide sealing between stationary member 92 and rotary member 94. The plate 138 and flange 136 lie on opposite sides of the flang 130 to relatively position the mid member 92 and upper member 94. The upper end of the member 94 is closed by an upper annular plate 144 having an O-ring 146 engaging the rotating shaft 96. Bolts 148 secure the plate 144 in place on member 94. A radial outlet port 150 extends into the chamber 134 and receives an outlet coupling 78 for the manifold 76 (see FIG. 2).

A worn bit to be repaired first has the old leg extensions 46 cut off by any known means. The transverse end surfaces 38 of the leg support portions 36 are prepared to receive new leg extensions. This preparation may require some machining in order to properly receive the new leg extension. The upper body portion of the prepared bit is threaded into the turret fixture 12 and the inlet fluid adapters 84 are inserted into the respective jet nozzle bores 44. The leg extensions 46, with cone assemblies mounted thereon, are positioned with their outer surfaces 48 engaging the end surfaces 38, aligned by any suitble means, and retained by fixtures (not shown) as necessary.

With the apparatus thus conditioned, the slide assembly 22 is pushed into the chamber 20 and the door closed to seal the assembly within the chamber. The chamber 20 is then evacuated and fluid circulated through the inlet 128, chamber 118, chamber 134, outlet 150, manifold 76, flexible conduits 80, adapters 82, bores 42, 44 to chamber 32 and return through the tubular shaft 96 and stud 104 to the outlet port 110.

As the fluid continues to circulate, the leg extensions 46 are welded to the leg portions 36, along mated surfaces 38 and 48, by electron beam welding or the like. The fluid, preferably a liquid selected from any of the well known coolants, including water, may be refrigerated if desired but, in any event, is circulated in relatively large volumes and at low pressure. For example, water under ordinary 40 psi pressure will circulate through ⅞" conduits and passages in the bit and swivel at a rate of about 10 gpm to provide adequate cooling. However, the construction of the present invention is such as to be able to withstand high pressure if that is considered preferable. By utilizing the mud circulation passageways of the bit body itself to circulate this fluid, the bit body becomes a heat sink. In addition, the circulating fluid carries heat away from the bit. In this manner, the vulnerable seals and bearings are protected from heat damage during the welding operation. This cooling is particularly effective where high energy beam welding, which is relatively fast, is used to further minimize heating of the bit.

When it is desired to change the position of the bit 18 relative to the energy beam (not shown), the turret fixture 12 is rotated on the swivel 14 by means (not shown) but which could be, for example, a friction wheel or gear engaging the outer surface of the upper rotatable member 94. Since the shaft 96 and upper member 94 rotate together with respect to the stationary members 90, 92 and the member 94 carries the flexible conduits 80 to the bit, it will be apparent that there will be no problem in rotating the bit or in the connections thereto preventing rotation. It should be here pointed out that the rotation of the bit is not a constant rotation, but merely a rotation of sufficient angular displacement to position each leg of the bit sequentially with respect to the welding beam.

Figure 6:
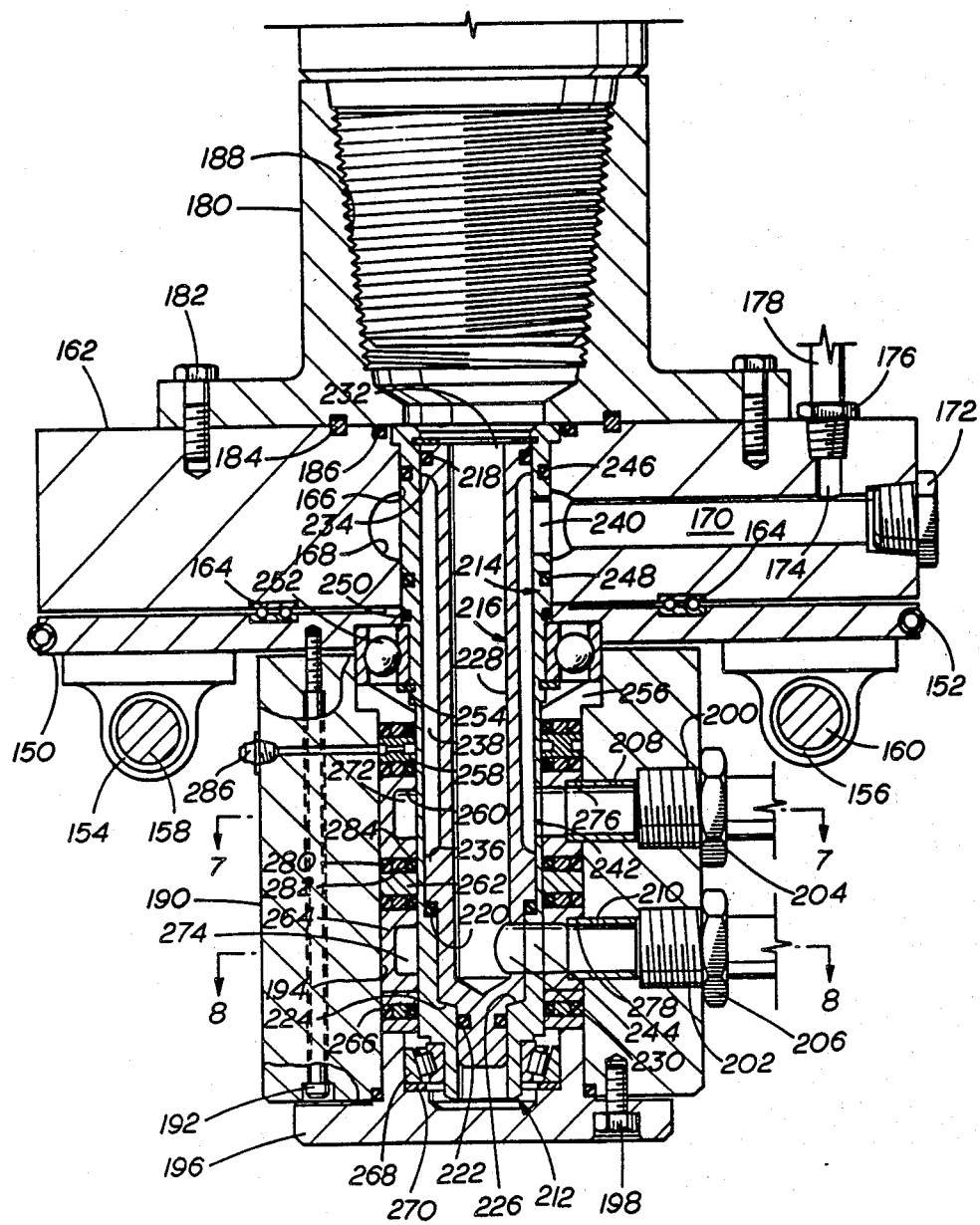
FIG. 6 is a vertical section through an alternate embodiment of the present invention.
Figure 8:
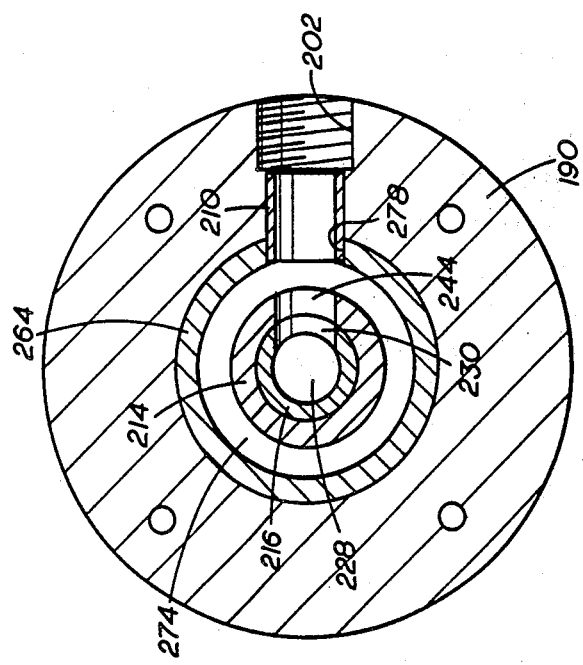
FIG. 8 is a transverse section taken along line 8—8 of FIG. 6.
Figure 7:
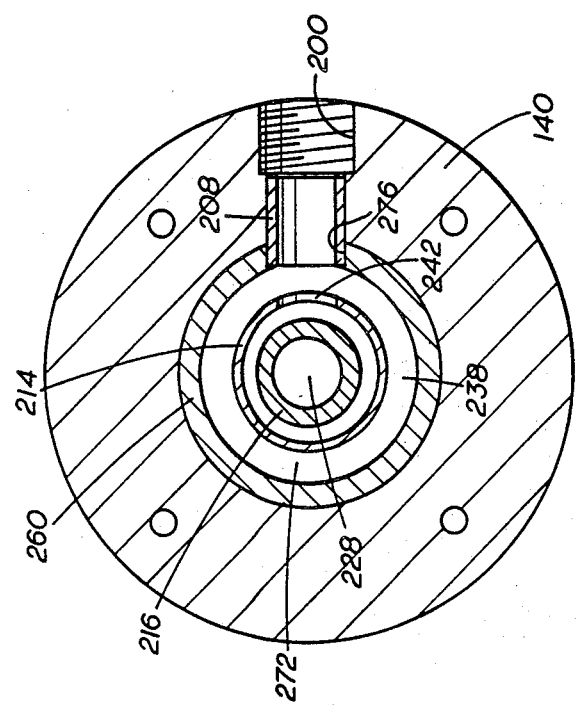
FIG. 7 is a transverse section taken along line 7—7 of FIG. 6.

An alternate embodiment of the present invention is shown in FIGS. 6, 7 and 8. In this embodiment, a plate-like slide 150 is provided on its entire outer periphery with an expandable seal 152. The slide 150 has a plurality of bearing assemblies 154, 156 supporting it on respective shafts 158, 160. The entire assembly can thus be slid into and out of the previously mentioned welding enclosure 20 with the seal 152 being inflated after the slide has been inserted to effect a sealed engagement.

Upper rotatable body 162 is supported on the plate 150 by a lazysusan bearing 164. The upper rotatable body 162 has an axial passage 166 including an annular chamber 168 with an exit passage 170 extending radially therefrom. The end of the passage 170 is closed by a plug 172 and an exit port 174 intersects the passage 170 parallel to and spaced from the axis of the passage 166. A coupling 176 is received in the port 174 and is connected to a conduit 178 leading to the fluid distribution manifold 76 of FIG. 2.

An interchangeable box 180 is mounted on the top side of upper rotatable body 162 by bolts 182 or the like with an alignment ring 184 and a sealing ring 186 therebetween. The box 180 has an internally threaded tapered bore 188 which receives therein the tool joint end of the bit (not shown in this Fig.). This arrangement allows for the box portion 180 to be replaced to accommodate bits of various sizes.

A lower fixed body 190 is secured to and depends from the lower side of the plate 150 by bolts 192. The lower fixed body 190 has a central axial passage 194 closed at its lower end by plate 196, which is held in place on lower fixed body 190 by bolts 198. An entry port 200 and exit port 202 extend radially through the lower fixed body 190 into the central passage 194 with each port having a fitting 204, 206 on the outer end thereof and sleeve 208, 210 on the inner end.

Extending axially through the upper rotatable and lower fixed bodies 162, 190 is a rotatable sleeve assembly 212 formed by an outer sleeve 214 and an inner sleeve 216 with sealing rings 218, 220, 222 therebetween. Shoulders 224 and 226 on the inner and outer sleeves, respectively, engage to maintain relative axial position of the sleeves. The inner sleeve 216 defines an axial passage 228 with a radially directed exit port 230 at its lower end and an axial port 232 at its upper end. The outer profile of sleeve 216 includes upper flange 234 and lower flange 236 defining a coaxial annular chamber 238 inside outer sleeve 214. Each flange 234, 236 receives a respective seal 218, 220.

The outer sleeve 214 is profiled on its outer surface to be received in the upper rotatable and lower fixed bodies 162, 190 with an upper radial exit port 240 opening in chamber 168, a mid radial entry port 242 and a lower exit port 244. O-ring seals 246, 248 are positioned between the outer sleeve 214 and the upper housing 162. An O-ring seal 250 and upper ball bearing assembly 252 are between the outer sleeve 214 and the plate 150. The ball bearing assembly 252 is held in place by a snap ring 254. The annular space between outer sleeve 214 and lower fixed body 190 is filled by an assembly including (starting from the top) compression ring 256, first sealing assembly 258, annular fluid entry member 260, second sealing assembly 262, annular fluid exit member 264, third sealing assembly 266, thrust bearing 268, and compression seal 270.

The annular fluid entry member 260 and annular fluid exit member 264 are substantially identical in that each receives the rotatable outer sleeve 214 therein and define an inwardly directed chamber 272, 274 and radial ports 276, 278, each port receiving the respective inner end of a sleeve 208, 210.

The first and second sealing assemblies 258, 262 are double seals, and the third sealing assembly 266 is a single seal. Each seal is formed by an outer static seal 280, an intermediate dynamic spacer 282 and an inner dynamic seal 284. The outer static seal 280 is O-ring sized to make a tight friction fit in the assembly and against the wall of passage 194. The inner dynamic seal 284 is also an O-ring of lesser dimensions than the outer static seal 280 and tightly engages the outer sleeve 214. The spacer 282 is an annular member of rigid or semi-rigid material intermediate the sizes of the static and dynamic seals. Thus, when there is rotation of the sleeve assembly 212, the inner dynamic seal 284 will move with the rotating outer sleeve 214 while the static seal 280 remains with the fixed body member 190. Should sufficient torque be generated, then the dynamic spacer 282 can rotate to relieve the torsional force. The sealing assemblies can have a grease fitting 286 if desired.

The operation of this embodiment is substantially the same as the previously described embodiment. The bit would be mounted in the box 180 by threading the tool joint portion into the threaded tapered box 188, and the leg extensions would be positioned for welding. The assembly would then be moved along the rails 158, 160 into the welding cabinet and sealed therein by closing the door and expanding the seal 152. Cooling fluid would then be introduced through the coolant system following a path from 204, 200, 208, 276, 242, 238, 240, 170, 174, 176, 80, through the bit, as previously described, to passage 232, 228, 230, 244, 278, 210, 202, 206 to exhaust or recycling of the coolant fluid. It will be appreciated that the coaxial annular chamber 238 will always be in contact with the annular chambers 168 and 272 through ports 240, 242 while the axial passage 228 will always be in contact with the chamber 274 through ports 230, 244.

Again, while this is not a high speed rotation but only rotational movement, it is necessary to maintain the fluid flow through the bit which is in a vacuum chamber. Lower body 190 is fixed to plate 150 and rotatably supports therein upper rotatable body 162 and rotatable sleeve assembly 212. Bearings 164, 252 and 268 support the members for relative rotation while sealing assemblies 258, 262 and 266 prevent leakage along the interface between the rotatable sleeve assembly 212 and fixed lower body 190.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A fixturing apparatus for use in assembling roller cone type rock bits, each said bit having an upper body with a tool joint portion adjacent one end and at least one leg portion adjacent the other end, said bit having a drilling fluid passage, said drilling fluid passage having at least two ends opening through said bit, and said bit being assembled by welding transversely across said leg portion said apparatus comprising:

a turret fixture profiled to engage said tool joint portion of said bit and having a turret cavity communicating with one end of said drilling fluid passage when so engaged;
a swivel mount rotatably supporting said turret fixture, said swivel mount comprising a fixed body and a rotatable body, and said swivel mount having a first flowway communicating with said turret cavity, and a second flowway, separate from said first flowway and at least partially defined by said rotatable body; and
conduit means interconnecting said bit and said rotatable body and communicating the other end of said drilling fluid passage with said second flowway to form, with said bit, said turret fixture, and said swivel mount a fluid circuit whereby coolant fluid can be provided to said bit regardless of the relative angular position thereof.

2. The fixturing apparatus according to claim 1 wherein said conduit means comprises:
a fluid manifold connected to said rotatable body; and
at least one conduit having one end connected to said manifold and a coupling on the other end, said coupling adapted to make fluidtight engagement in said other end of said drilling fluid passage.

3. The fixturing apparatus according to claim 1 wherein said swivel mount further comprises:
a shaft assembly extending between said fixed and rotatable bodies providing both a rotational axis and fluid coupling therebetween.

4. The fixturing apparatus according to claim 3 wherein said shaft assembly comprises a pair of concentrically mounted sleeves defining a first axial passage comprising part of said first flowway and a second coaxial annular passage comprising part of said second flowway.

5. The fixturing apparatus according to claim 3 wherein said conduit means comprises:
a fluid manifold connected to said rotatable body;
at least one conduit having one end connected to said manifold and a coupling on the opposite end adapted to make fluid connection to said other end of said drilling fluid passage.

6. The fixturing apparatus according to claim 1 wherein said turret fixture has a rotatable base with a removable receptacle thereon whereby bits of different sizes can be accommodated.

7. The fixturing apparatus according to claim 1 further comprising:
a welding cabinet having a slide, said swivel mount secured to said slide by said fixed body with said rotatable body within said cabinet.

8. The fixturing apparatus according to claim 7 further comprising bearings rotatably supporting said rotatable body on said slide.

9. The fixturing apparatus according to claim 7 further comprising support shafts and bearings connected to said slide for moving it into and out of said cabinet.

10. The fixturing apparatus according to claim 7 further comprising seals on the peripheral edge of said slide to sealingly engage with said cabinet.

11. The fixturing apparatus according to claim 10 wherein said seals are inflatable.

12. The fixturing apparatus according to claim 3 wherein said shaft assembly maintains the relative spacing of said rotatable and fixed bodies.

13. The fixturing apparatus according to claim 1 wherein:

said rotatable body is a generally annular upper body having opposed upper and lower surfaces;

said fixed body is a generally annular lower body having an upper surface; and said swivel mount further comprises a shaft assembly extending through said upper and lower bodies to provide two-way fluid communication therebetween.

14. The fixturing apparatus according to claim 13 wherein said shaft assembly comprises:

an inner tubular shaft defining an axial chamber comprising part of said first flowway; and an outer tubular shaft defining a coaxial annular chamber comprising part of said second flowway, each said chamber opening on one end in said upper body and on the other end in said lower body whereby two-way fluid communication is established through said swivel.

15. The fixturing apparatus according to claim 14 further comprising:

upper and lower annular chambers surrounding adjacent portions of said shaft assembly;

said outer shaft having upper and lower ports aligned with said upper and lower chambers;

said inner shaft having a single port aligned with one of said outer shaft ports and respective chamber whereby the axial and coaxial chambers of said shaft assembly are in constant communication with said upper and lower chambers.

16. The fixturing apparatus according to claim 14 further comprising:

first seals between said inner and outer tubular shafts; and second seals between said outer tubular shaft and said upper and lower bodies.

17. A fixturing apparatus for supporting and temperature controlling a body member during welding thereon of subassemblies, said body member having at least one fluid passageway therein, said apparatus comprising:

a receptacle profiled to mount said body member in fluid exchange relationship;

means to circulate fluid through said body member;

means for rotating said receptacle to facilitate said welding operation while permitting an uninterrupted flow of fluid through said body member and receptacle means.

18. A method of assembling a roller cone type rock bit comprising the steps of:

on a main body member having a tool joint portion adjacent one end, at least one leg portion adjacent the other end and drilling fluid passage means extending from said tool joint portion to adjacent each said leg portion, providing said leg portion with an outer transverse surface;

on a base for a cone assembly providing an end transverse surface configured to mate with said outer transverse surface of said leg portion of said main body member;

rotatably mounting a roller cone on said base distal said end transverse surface to form a cone assembly;

mating said end transverse surface of said base with said outer transverse surface of said leg portion;

providing a cooling fluid system including said drilling fluid passage in said main body member; and welding said base to said leg portion along the juncture of said mating transverse surfaces to mount said cone assembly on said leg portion, said welding being accomplished while passing coolant through said cooling fluid system to dissipate excessive heat generated by said welding thereby protecting components in said cone assembly.

19. A method of assembling a roller cone type rock bit according to claim 18 further comprising rotating said main body member about its axis to sequentially position a plurality of such leg portions with respect to a welding apparatus.

20. A method of assembling a roller cone type rock bit according to claim 18 further comprising the step of placing said main body member and cone assemblies in a vacuum prior to welding.

21. A method of assembling a roller cone type rock bit according to claim 18 wherein said welding is by electron beam.

22. A method of assembling a roller cone type rock bit according to claim 18 wherein cooling fluid is circulated at a high volume and low pressure rate.

23. The fixturing apparatus according to claim 1 wherein said one end of said drilling fluid passage opens axially through said tool joint portion, and the other end of said drilling fluid passage opens adjacent the crown of said bit.

24. The fixturing apparatus according to claim 23 wherein said first flowway comprises a portion extending along the axis of said swivel mount, and said second flowway comprises an annular chamber.

25. The fixturing apparatus according to claim 24 wherein said turret cavity is at least partially defined by a box thread for receiving the tool joint portion of the bit.

26. The fixturing apparatus according to claim 3 wherein said shaft assembly is mounted for joint rotation with said rotatable body to form therewith a rotatable sub-assembly.

27. The fixturing apparatus according to claim 26 wherein said swivel mount further comprises thrust bearing means for transmitting axial loads between said rotatable sub-assembly and said fixed body.

28. The fixturing apparatus according to claim 27 wherein said thrust bearing means is disposed between said shaft assembly and said fixed body.

29. The fixturing apparatus according to claim 26 wherein said swivel mount further comprises sealing means between said rotatable sub-assembly and said fixed body, said sealing means comprising:

a first annular sealing member sealing against and rotating with said rotatable sub-assembly;

a second annular sealing member coaxially surrounding said first sealing member and sealing against and stationary with said fixed body;

and a third annular sealing member disposed coaxially between and engaging said first and second sealing members, said third sealing member being rotatable with respect to both of said first and second sealing members.

30. The fixturing apparatus according to claim 29 wherein said third sealing member is adapted to rotate more easily with respect to one of the first or second sealing members than the other.

* * * * *